United States Patent
Horiguchi

(10) Patent No.: US 9,541,915 B2
(45) Date of Patent: Jan. 10, 2017

(54) NUMERICAL CONTROLLER HAVING FUNCTION OF SWITCHING POSITION CONTROL GAIN DURING SYNCHRONOUS CONTROL

(71) Applicant: FANUC Corporation, Minamitsuru-Gun, Yamanashi (JP)

(72) Inventor: Kouichirou Horiguchi, Minamitsuru-gun (JP)

(73) Assignee: FANUC CORPORATION, Minamitsuru-gun, Yamanashi (JP)

( * ) Notice: Subject to any disclaimer, the term of this patent is extended or adjusted under 35 U.S.C. 154(b) by 24 days.

(21) Appl. No.: 14/733,992

(22) Filed: Jun. 9, 2015

(65) Prior Publication Data
US 2015/0362895 A1 Dec. 17, 2015

(30) Foreign Application Priority Data

Jun. 17, 2014 (JP) .................. 2014-124609

(51) Int. Cl.
*G05B 19/18* (2006.01)
*G05B 19/19* (2006.01)

(52) U.S. Cl.
CPC ..... *G05B 19/19* (2013.01); *G05B 2219/50218* (2013.01)

(58) Field of Classification Search
CPC .......... H02P 6/18; H02P 5/46; B60L 2220/14; H02K 19/00; H02K 19/02; H02K 17/26; H02K 19/16

(Continued)

(56) References Cited

U.S. PATENT DOCUMENTS 4,712,953 A 12/1987 Witzel et al.
7,148,365 B2 * 12/2006 Pleschke .............. C07D 317/46
549/534

(Continued)

FOREIGN PATENT DOCUMENTS

JP S60-005306 A 1/1985
JP H08-39392 A 2/1996

(Continued)

OTHER PUBLICATIONS

Zirn, O. and Fink, A., "Master-Slave Control for Milling Rotary Tables with Flexible Reduction Stages," EPE Chapter "Electric Drives" Joint Symposium Jul. 1-3, 2009, Electromotion 2009, Jul. 2009, pp. 1-6.

(Continued)

*Primary Examiner* — Antony M Paul
(74) *Attorney, Agent, or Firm* — Drinker Biddle & Reath LLP

(57) ABSTRACT

A numerical controller outputs a position command corresponding to a synchronous position in consideration of a servo delay of a slave axis, to the slave axis from a real position of a master axis, in order to perform position control of the slave axis, thereby making a real position of the slave axis synchronously follow the real position of the master axis. A position control gain of the slave axis is changed based on a predetermined physical quantity during the synchronous control and a compensation value for the position command for the slave axis is varied depending on the amount of change of the position control gain of the slave axis.

6 Claims, 3 Drawing Sheets

(58) Field of Classification Search
USPC .......... 318/85, 560, 561, 568.18, 568.22, 569,318/574, 575, 594, 607, 625, 632, 633, 652,318/661, 400.4, 686, 119, 135, 400.01, 400.14,318/400.15, 700, 701, 727, 799, 800, 801, 705,318/286, 556, 432, 437; 388/800
See application file for complete search history.

(56) References Cited

U.S. PATENT DOCUMENTS

| | | | | |
|---|---|---|---|---|
| 7,671,553 | B2* | 3/2010 | Terada | G05B 19/19 318/432 |
| 8,587,247 | B2* | 11/2013 | Yoshiura | G05B 19/4141 318/432 |
| 2005/0168178 | A1 | 8/2005 | Toyozawa et al. | |
| 2007/0007926 | A1 | 1/2007 | Iwashita et al. | |
| 2008/0218116 | A1 | 9/2008 | Maeda et al. | |

FOREIGN PATENT DOCUMENTS

| | | |
|---|---|---|
| JP | 2003-131712 A | 5/2003 |
| JP | 2005-099981 A | 4/2005 |
| JP | 2005-216135 A | 8/2005 |
| JP | 2007-042068 A | 2/2007 |
| JP | 2008-225533 A | 9/2008 |
| JP | 2011-067016 A | 3/2011 |
| JP | 2012-014719 A | 1/2012 |

OTHER PUBLICATIONS

Sakata, K. and Fujimoto, H., "Master-Slave Synchronous Position Control for Precision Stages Based on Multirate Control and Dead-time Compensation," 2009 IEEE/ASME International Conference on Advanced Intelligent Mechatronics Jul. 14-17, 2009, AIM 2009, Sep. 2009, pp. 263-268.

Notification of Reasons for Refusal issued Oct. 6, 2015 in Japanese Patent Application No. 2014-124609 (3 pages) with an English Translation (3 pages).

* cited by examiner

NUMERICAL CONTROLLER HAVING FUNCTION OF SWITCHING POSITION CONTROL GAIN DURING SYNCHRONOUS CONTROL

RELATED APPLICATION DATA

This application claims priority under 35 U.S.C. §119 and/or §365 to Japanese Application No. 2014-124609 filed Jun. 17, 2014, the entire contents is incorporated herein by reference.

BACKGROUND OF THE INVENTION

Field of the Invention

The present invention relates to a numerical controller for controlling machine tools and industrial machines, and more particularly, to a numerical controller having a function of switching a position control gain during synchronous control.

Description of the Related Art

In a synchronous controller configured so that the position of a master axis is fetched by means of a sensor or the like and a slave axis is synchronized with the master axis position, an actual position (real position) of the master axis is obtained and a command synchronized with the real position is given to the slave axis. If the synchronization command is given to the slave axis based on the real position of the master axis, a delay of a servomotor for the slave axis inevitably occurs as a synchronization error. To cancel this synchronization error, a position (expected position) at a future time corresponding to a position control gain of the slave axis is expected, and a synchronization command for the expected position is given to the slave axis.

Japanese Patent Application Laid-Open No. 2011-67016 discloses a technique for a machine or the like to which an electronic cam is applied. According to this technique, a phase lead circuit called a lead-angle control is added to a servo controller for positioning, whereby a delay of a control system is compensated to reduce a positional deviation, which is the difference between a position command value and a position detection value. Further, Japanese Patent Application Laid-Open No. 60-5306 discloses a technique in which a gain is switched during control.

If the position of the slave axis is falsely expected on account of a change of the speed of the master axis, the difference between the expected position and a synchronous position of the slave axis undesirably increases. Consequently, a correct synchronous position of the slave axis cannot be calculated, so that a synchronization error inevitably occurs. Thus, if the master axis speed changes, the slave axis cannot correctly synchronize with the motion of the master axis. In general, the longer an expectation time, the larger the difference between the expected position and the synchronous position tends to be. The lower the position control gain, the longer the expectation time is, the larger the difference between the expected position and the synchronous position is, and the higher the synchronization error is.

For example, a packing machine is configured so that goods are packed, by a holding device driven by a slave axis, into a box that is conveyed by a conveyor driven by a master axis. In the packing machine of this type, the position of the conveyor is obtained by a sensor or the like, and synchronous control is performed such that an axis for packing is driven in accordance with the position of the box on the conveyor. The packing machine cannot perform accurate packing unless the position of the axis (slave axis) for packing is correctly synchronized with an actual position (real position) of the axis (master axis) for driving the conveyor.

In order to synchronize the real position of the slave axis with that of the master axis without an error, in this packing machine, the synchronization command for the slave axis is compensated in consideration of a servo delay. The servo delay is compensated by, for example, expecting the position at the future time corresponding to the position control gain of the slave axis and commanding the expected position as the synchronous position.

If the speed of the synchronized master axis changes, the expected position is deviated from an actual synchronous position, and the deviation causes a synchronization error that results in a reduction in synchronization performance. As described above, this expectation time is determined depending on the position control gain, that is, the lower the position control gain, the longer the expectation time is. In general, the longer the expectation time, the more easily the difference between the expected position and the synchronous position occurs. In other words, the lower the gain, the longer the expectation time is, and the higher the synchronization error is.

Now let us suppose that the position control gain of the slave axis is constant during synchronization. If the position control gain is high when the master axis vibrates in a certain section during the synchronization, there is a problem that the synchronization performance is greatly affected by the vibration to cause a synchronization error in the vibration section, although it is satisfactory outside the vibration section. If the position control gain is low, in contrast, there is a problem that a synchronization error is caused by a speed change of the master axis, although the influence of the vibration is small.

SUMMARY OF THE INVENTION

Accordingly, in view of the above-described problems of the prior art, it is an object of the present invention to provide a numerical controller having a function of appropriately switching a position control gain during synchronous control.

A numerical controller according to the present invention outputs a position command corresponding to a synchronous position in consideration of a servo delay of a slave axis, to the slave axis from a real position of a master axis, in order to perform position control of the slave axis, thereby making a real position of the slave axis synchronously follow the real position of the master axis. In this numerical controller, a position control gain of the slave axis is changed based on a predetermined physical quantity during the synchronous control and a compensation value for the position command for the slave axis is varied depending on the amount of change of the position control gain of the slave axis.

The position control gain may be gradually increased and the compensation value is gradually reduced correspondingly. In contrast, the position control gain may also be gradually reduced and the compensation value is gradually increased correspondingly.

The predetermined physical quantity may be data on a synchronization error, an external input signal, a time elapsed since the start of synchronization, a master axis position, a slave axis position, a master axis speed, a slave axis speed, or a servo delay of the slave axis.

According to the present invention, there can be provided a numerical controller having a function of switching a position control gain during synchronous control.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
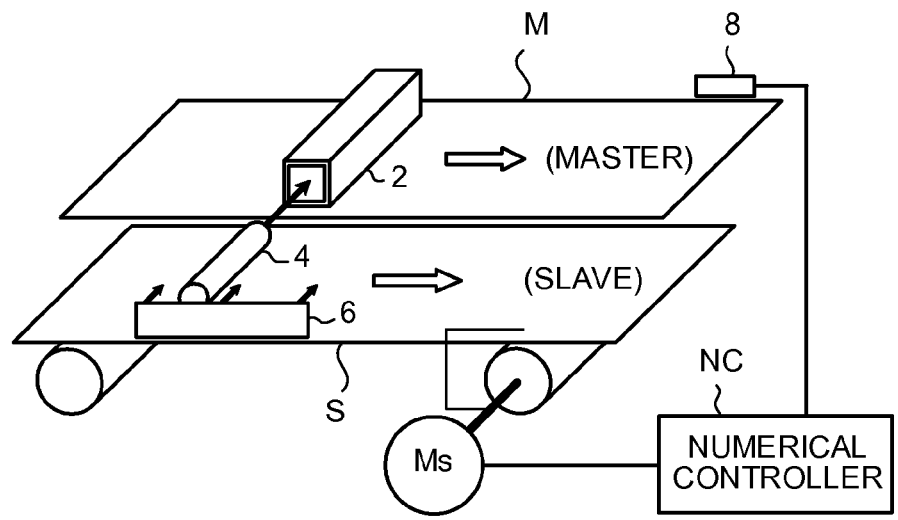
FIG. 1 is a diagram showing a packing machine device configured to pack a bottle into a box conveyed by a conveyor.

FIG. 1 is a diagram showing a packing machine device configured so that a bottle 4 conveyed by a second conveyor S is packed by insertion means 6 into a box 2 conveyed by a first conveyor M.

In the packing machine device of FIG. 1, the first conveyor M is driven by a drive unit (not shown) different from that of the second conveyor S, which is driven by a servomotor Ms controlled by a numerical controller NC. An axis that drives the first conveyor M is assumed to be a master axis, while an axis that drives the second conveyor S is assumed to be a slave axis. The slave axis is synchronously controlled by the numerical controller NC so that it synchronizes with the master axis. The position and speed of the master axis can be detected by a position/speed detector 8 attached to the first conveyor M. Further, the position and speed of the slave axis can be detected by a position/speed detector (not shown) attached to the slave axis.

The numerical controller NC comprises a processor (CPU), memories such as a ROM and a RAM, input/output circuit, communication interface, and the like. The numerical controller NC performs position feedback control in response to a feedback signal from a sensor (not shown) attached to the servomotor Ms or the second conveyor S that is driven by the servomotor Ms.

In the packing machine of FIG. 1 configured so that the bottle conveyed by the second conveyor S driven by the slave axis (servomotor Ms) is packed into the box conveyed by the first conveyor M, for example, the position and speed of the first conveyor M are obtained by the sensor 8 or the like. Synchronous control of the slave axis is performed so as to align the position of the bottle conveyed by the second conveyor S with the position of the box on the first conveyor M. The packing machine can accurately pack the bottle by fetching an actual position (real position) of the first conveyor M as the position of the master axis and correctly synchronizing the position of the second conveyor S (slave axis) with the fetched position.

The following is a description of some embodiments of the numerical controller having a function of switching a position control gain during synchronous control to solve problems of the present invention.

First Embodiment of Numerical Controller

In a first embodiment of the numerical controller according to the present invention, position control gains individually suited for a vibration section of the master axis and an area outside the vibration section are set to switch the position control gain of the slave axis during synchronous control and change a compensation value correspondingly. By making a compensation according to the set position control gain, the numerical controller can improve tracking performance for a speed change while suppressing an influence on disturbance, thereby suppressing an increase in synchronization error. The start of the position control gain switching for the slave axis can be determined based on the synchronization error.

Second Embodiment of Numerical Controller

Figure 2:
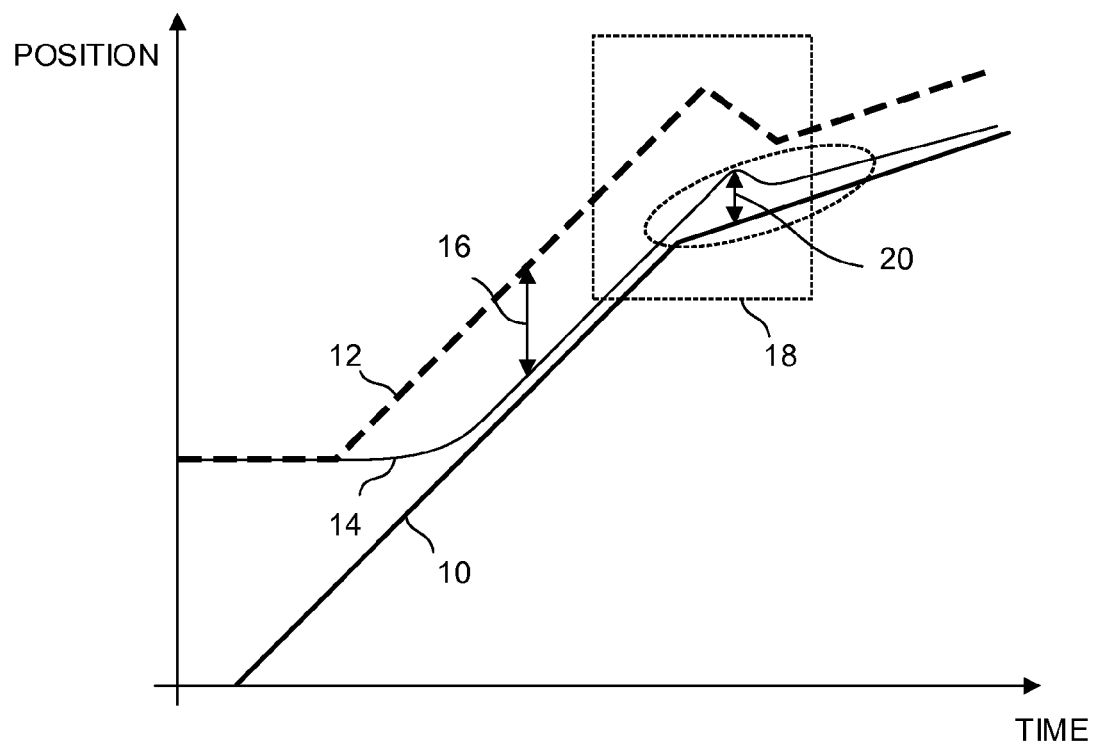
FIG. 2 is a diagram showing a case where a synchronization error occurs in synchronization based on an expected compensation when a speed of a master axis is changed.

FIG. 2 is a diagram illustrating an operation in synchronization with the movement of the master axis, starting from a state where the slave axis is stopped. In FIG. 2, the abscissa and ordinate represent time and position, respectively. Further, a full line (thick line) 10 represents the real position of the master axis, dotted line 12 represents a slave axis command position, full line (thin line) 14 represents a slave axis real position, and arrow 16 represents a servo delay. Furthermore, a square area 18 and an elliptical area 20 represent areas for a speed change and a synchronization error, respectively.

As indicated by the full line (thick line) 10 that represents the master axis real position, the master axis moves at a constant speed and slows down at a flexion point in the area 18. On the other hand, the slave axis starts synchronization with a low gain in order to reduce mechanical shock attributable to sudden acceleration at the start of synchronous operation. Thus, the servo delay represented by the arrow 16 occurs between the dotted line 12 that represents the slave axis command position and the full line (thin line) 14 that represents the slave axis real position.

If the speed of the master axis is changed during the synchronous control, as indicated by the square area 18 (representative of a speed change) in FIG. 2, the slave axis command position 12 of which expectation time is corrected cannot respond to the speed change of the master axis because of a long expectation time. Thus, the synchronization error 20 inevitably occurs between the slave axis real position 14 and the master axis real position 10. The larger the expected amount, the greater the synchronous error 20 is.

Figure 3:
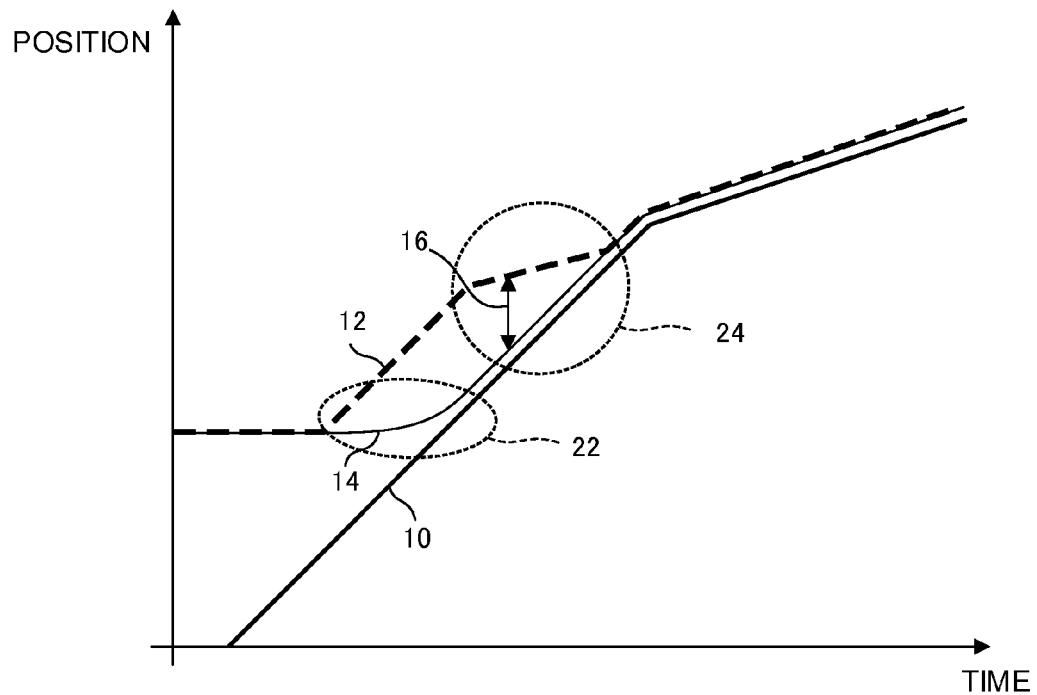
FIG. 3 is a diagram illustrating a second embodiment of a numerical controller according to the present invention.

As shown in FIG. 3, in this second embodiment, a position control gain is increased during synchronous control and a compensation based on expectation is reduced correspondingly. In this way, synchronous tracking performance can be increased to suppress the synchronization error even when the speed of the master axis is changed. In FIG. 3, an elliptical area 22 represents an area in which synchronization is smoothly started because of the low gain. Further, a circular area 24 represents an area in which the gain is increased to reduce the compensation for servo delay (i.e., to bring the command position close to the real position).

According to this embodiment, the start of movement is made smooth by suppressing the position control gain of the slave axis at the start of synchronization, the position control gain is gradually increased when the synchronization error is, for example, reduced to a predetermined value or less during the synchronous control (area 24), and the compensation based on expectation is reduced correspondingly. In this way, the synchronous tracking performance for the motion of the master axis can also be increased.

Third Embodiment of Numerical Controller

If an attempt is made to terminate synchronization with the position control gain remaining high while the master axis is moving, the slave axis suddenly stops, thereby causing mechanical shock.

Figure 4:
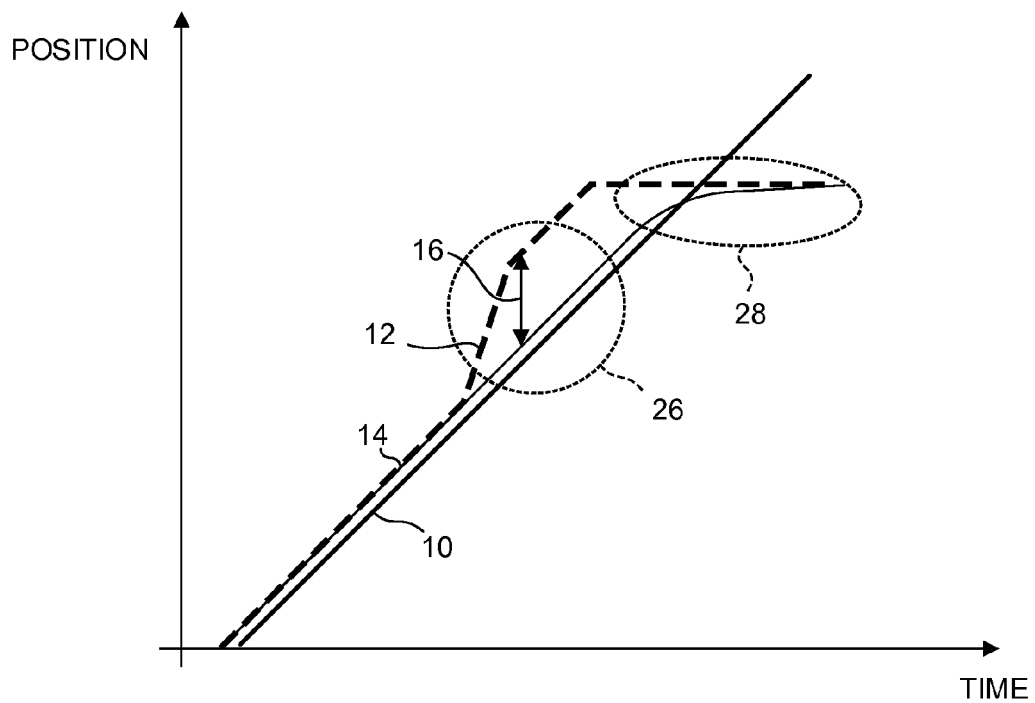
FIG. 4 is a diagram illustrating a third embodiment of the numerical controller according to the present invention.

As shown in FIG. 4, in this embodiment, therefore, the position control gain is gradually reduced before the end of synchronous control, and compensation for servo delay is gradually increased correspondingly. In this way, the slave axis can be smoothly stopped even if synchronization is stopped while the master axis is moving. In FIG. 4, a circular area 26 represents an area in which the gain is reduced to increase the compensation for servo delay (i.e., to separate the command position from the real position). Further, an elliptical area 28 represents an area in which the slave axis smoothly stops because of the low gain.

Fourth Embodiment of Numerical Controller

In this embodiment, the start of position control gain switching for the slave axis is determined based on any one of information including an external input signal, time elapsed since the start of synchronization, master axis position, slave axis position, master axis speed, slave axis speed, and servo delay of the slave axis, in place of the synchronization error.

Figure 5:
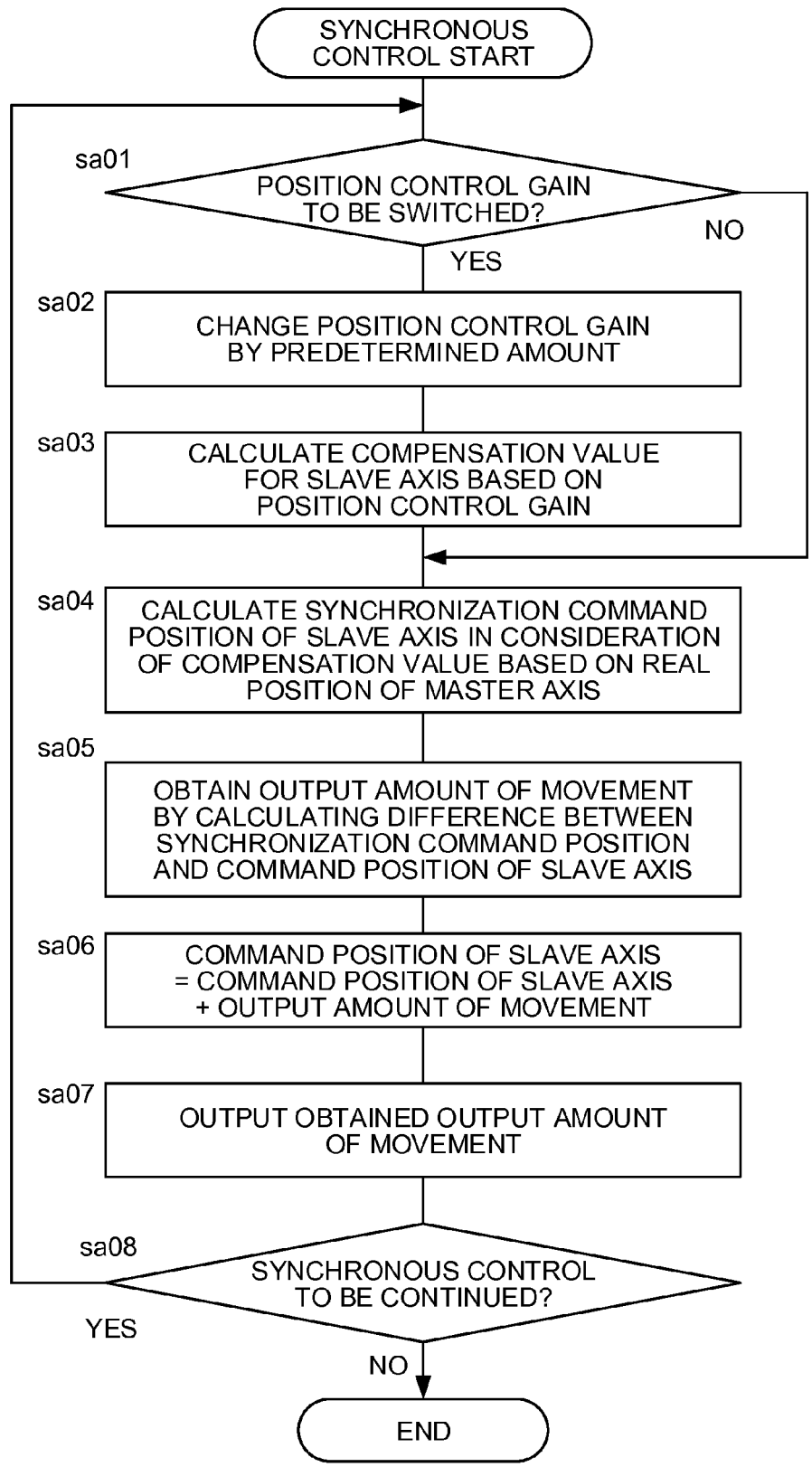
FIG. 5 is a flowchart showing synchronous control processing performed by the numerical controller according to the present invention.

FIG. 5 is a flowchart showing synchronous control processing performed by the numerical controller according to the present invention. The following is a sequential description of steps.

[Step sa01] It is determined whether or not to switch the position control gain. If the position control gain is to be switched (YES), the processing proceeds to Step sa02. If not (NO), the processing proceeds to Step sa04. Whether or not to switch the position control gain can be determined based on the synchronization error, external input signal, time elapsed since the start of synchronization, master axis position, slave axis position, master axis speed, slave axis speed, or servo delay of the slave axis.

[Step sa02] The position control gain is changed by a predetermined amount.

[Step sa03] A compensation value for the slave axis, e.g., compensation for the time delayed by the gain, is calculated based on the position control gain.

[Step sa04] The synchronization command position of the slave axis is calculated in consideration of the compensation value for the slave axis, based on the real position of the master axis.

[Step sa05] An output amount of movement of the slave axis is obtained by calculating the difference between the synchronization command position and the command position of the slave axis.

[Step sa06] The output amount of movement obtained in Step sa05 is added to the command position of the slave axis, and the result of the addition is used as the command position of the slave axis.

[Step sa07] The output amount of movement obtained in Step sa05 is output.

[Step sa08] It is determined whether or not to continue the synchronous control. If the synchronous control is to be continued (YES), the processing proceeds to Step sa01. If not (NO), the processing ends. Whether or not to continue the synchronous control can be determined based on, for example, a programmed command or an external command.

In the processing of the flowchart described above, clamp control or acceleration and deceleration control may be performed as required for the synchronous control of the slave axis.

As described above, the numerical controller according to the present invention may have the function of switching the position control gain during synchronous control. Further, the servo delay of the slave axis is reduced by increasing the position control gain, so that the expected amount is reduced. Thus, the synchronization error is small even when the master axis speed varies. At the start of synchronization, the start of movement can be made smooth by suppressing the position control gain. After a synchronization state is stabilized, the movement of the master axis can be promptly followed to improve the synchronization performance by increasing the position control gain. When the master-slave synchronization state is stabilized, e.g., when the master axis is in a constant-speed state, the position control gain is gradually increased, while the compensation based on expectation from a synchronization command is gradually reduced.

The invention claimed is:

1. A numerical controller that outputs a position command corresponding to a synchronous position in consideration of a servo delay of a slave axis, to the slave axis from a real position of a master axis, in order to perform position control of the slave axis, thereby making a real position of the slave axis synchronously follow the real position of the master axis,
wherein a position control gain of the slave axis is changed based on a predetermined physical quantity during the synchronous control and a compensation value for the position command for the slave axis is varied depending on the amount of change of the position control gain of the slave axis.

2. The numerical controller according to claim 1, wherein the position control gain is gradually increased and the compensation value is gradually reduced correspondingly.

3. The numerical controller according to claim 2, wherein the predetermined physical quantity is data on a synchronization error, an external input signal, a time elapsed since the start of synchronization, a master axis position, a slave axis position, a master axis speed, a slave axis speed, or a servo delay of the slave axis.

4. The numerical controller according to claim 1, wherein the position control gain is gradually reduced and the compensation value is gradually increased correspondingly.

5. The numerical controller according to claim 4, wherein the predetermined physical quantity is data on a synchronization error, an external input signal, a time elapsed since the start of synchronization, a master axis position, a slave axis position, a master axis speed, a slave axis speed, or a servo delay of the slave axis.

6. The numerical controller according to claim 1, wherein the predetermined physical quantity is data on a synchronization error, an external input signal, a time elapsed since the start of synchronization, a master axis position, a slave axis position, a master axis speed, a slave axis speed, or a servo delay of the slave axis.

\* \* \* \* \*